(12) United States Patent
Chiu et al.

(10) Patent No.: US 6,860,560 B2
(45) Date of Patent: Mar. 1, 2005

(54) SEAT BACK RECLINER FOR VEHICLES

(75) Inventors: Wen H. Chiu, Livonia, MI (US); Karl A. Murphy, Novi, MI (US)

(73) Assignee: Porter Group, LLC, Novi, MI (US)

( * ) Notice: Subject to any disclaimer, the term of this patent is extended or adjusted under 35 U.S.C. 154(b) by 135 days.

(21) Appl. No.: 10/396,882

(22) Filed: Mar. 25, 2003

(65) Prior Publication Data

US 2004/0189072 A1 Sep. 30, 2004

(51) Int. Cl.[7] .............................................. B60N 2/20
(52) U.S. Cl. .................................... 297/367; 297/366
(58) Field of Search ....................... 297/378.14, 378.12, 297/378.1, 367, 366

(56) References Cited

U.S. PATENT DOCUMENTS

| | | | |
|---|---|---|---|
| 3,736,026 A | | 5/1973 | Ziegler et al. |
| 5,138,744 A | * | 8/1992 | Coggon ........................ 16/325 |
| 5,154,476 A | | 10/1992 | Haider et al. |
| 5,690,386 A | | 11/1997 | Chabanne |
| 5,718,481 A | | 2/1998 | Robinson |
| 6,454,355 B2 | | 9/2002 | Biletskiy |
| 6,502,903 B2 | * | 1/2003 | Bruck et al. ........... 297/378.11 |
| 6,511,129 B1 | * | 1/2003 | Minor et al. ................ 297/367 |
| 6,540,232 B2 | * | 4/2003 | Hansel et al. ............... 277/367 |
| 2002/0135216 A1 | | 9/2002 | Hamelin et al. |
| 2004/0056523 A1 | * | 3/2004 | Grable et al. .......... 297/378.12 |

* cited by examiner

Primary Examiner—Milton Nelson, Jr.
(74) Attorney, Agent, or Firm—Brooks Kushman P.C.

(57) ABSTRACT

A vehicle seat back recliner (24) includes a lock mechanism (50) having a locking pawl (52) for locking a seat back pivotal bracket (44) against pivoting with respect to a seat cushion stationary bracket (34) under the operation of an associated control cam (54) and a locking pawl catch (56). The catch (56) holds the locking pawl (52) in an unlocked position until the seat back is pivoted upwardly from a horizontal cargo position to an upright use position whereupon the catch releases the locking pawl and the control cam (54) maintains the locking pawl in its locked position. Pivoting of the control cam (54) against a spring bias provides release of the locking pawl (52) to permit seat back pivoting from a upright use position to the horizontal cargo position.

12 Claims, 4 Drawing Sheets

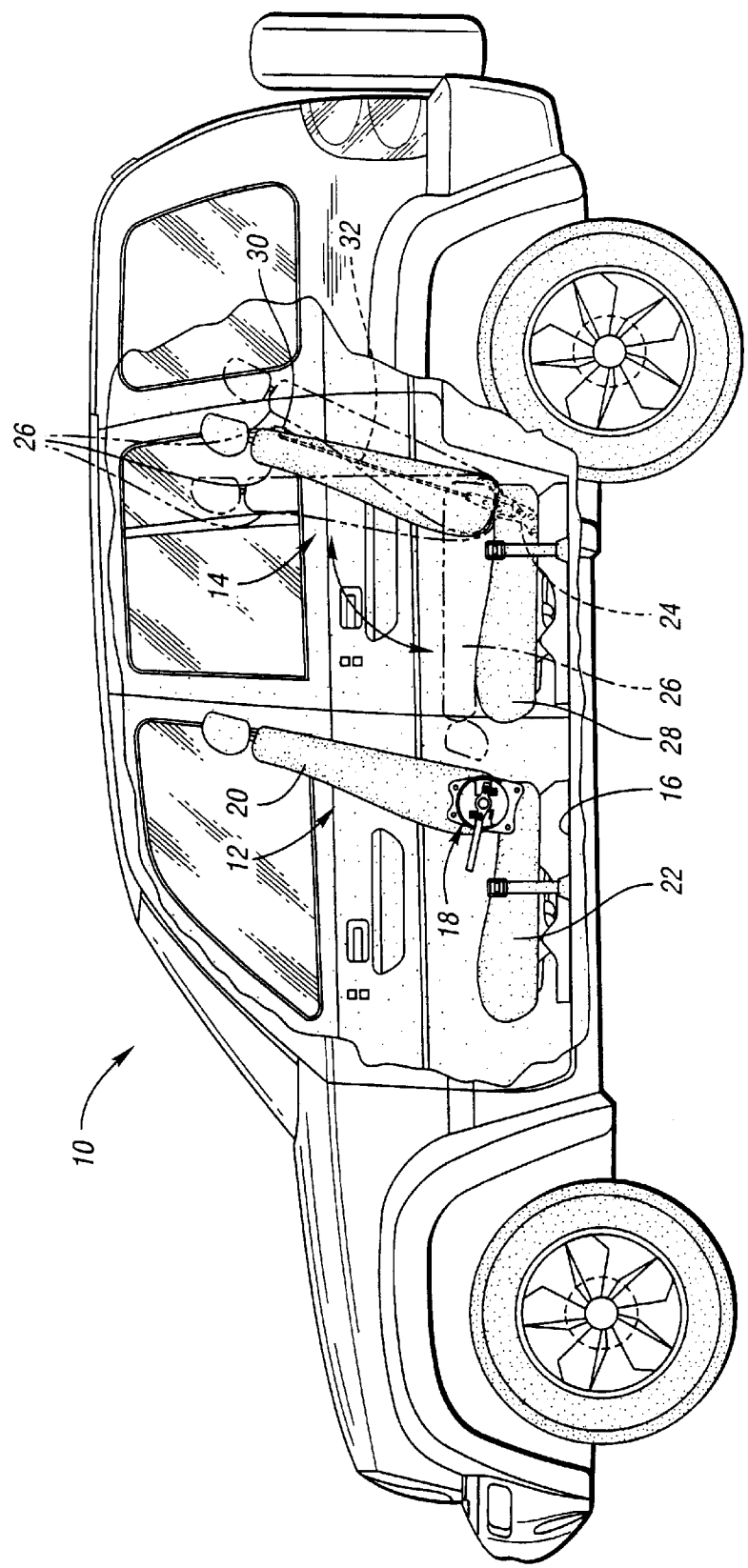

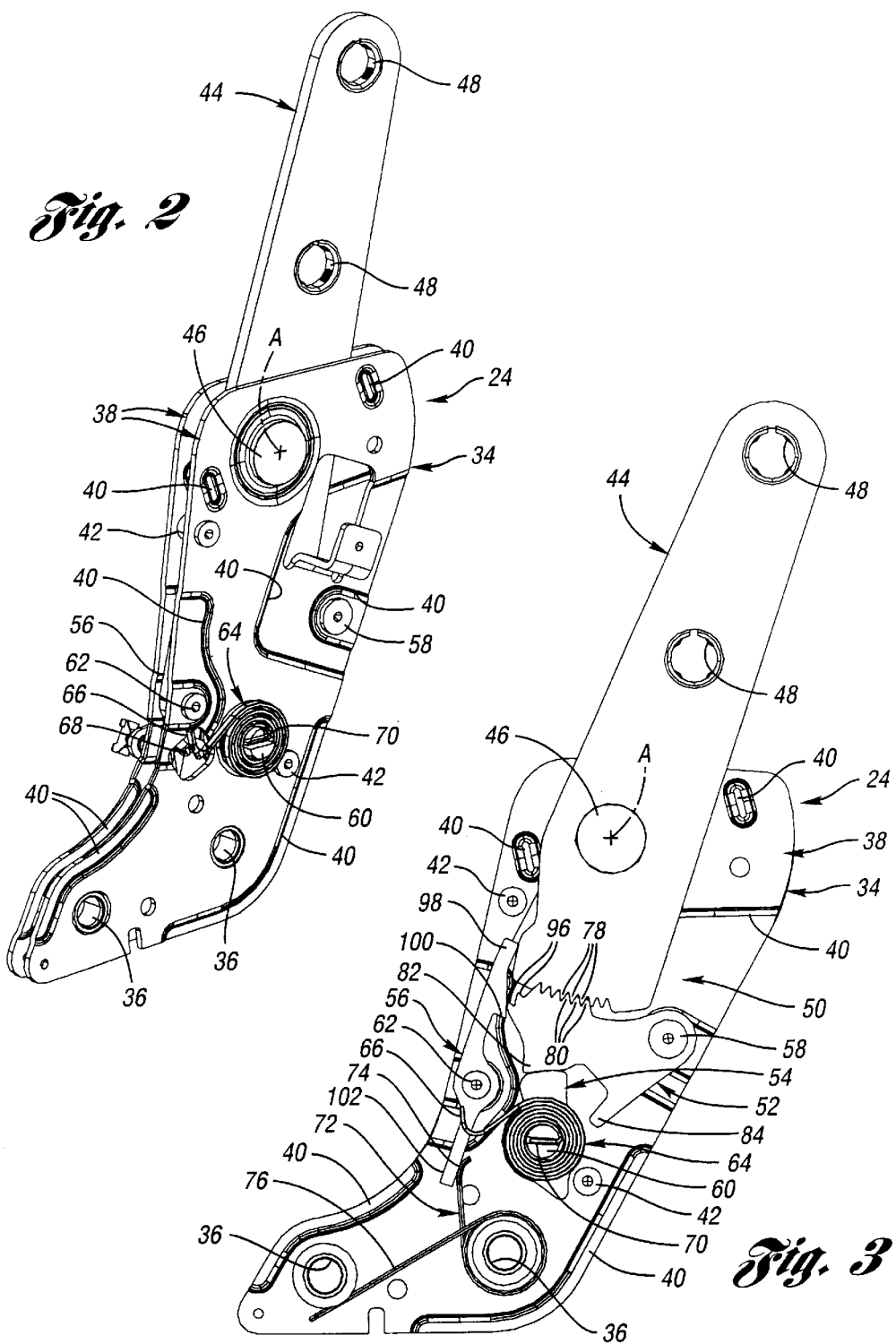

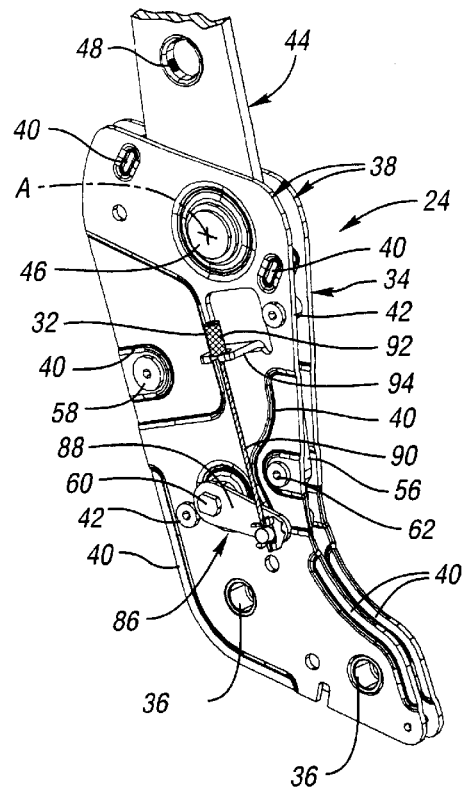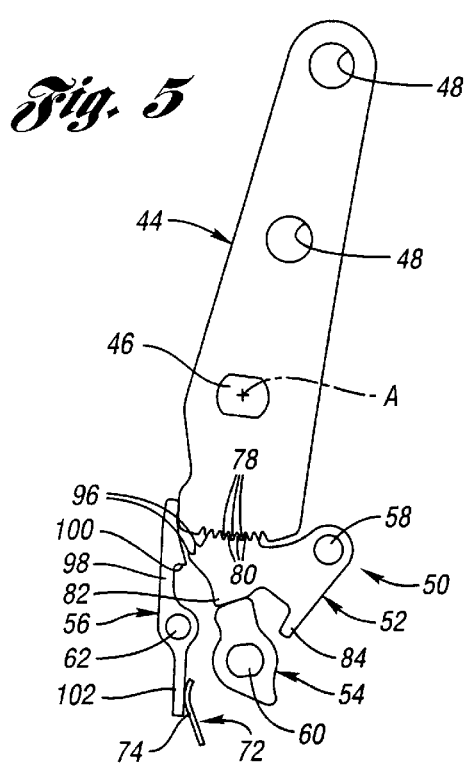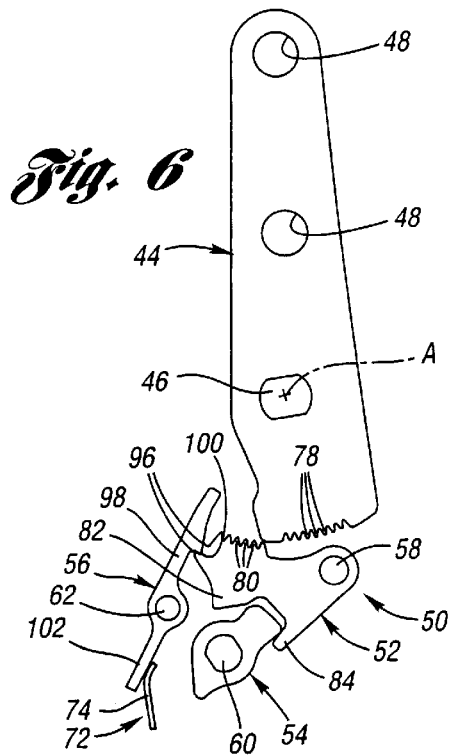

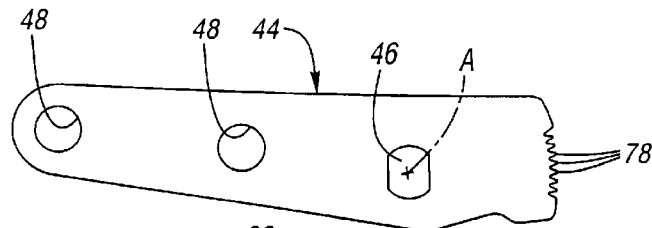
Fig. 7
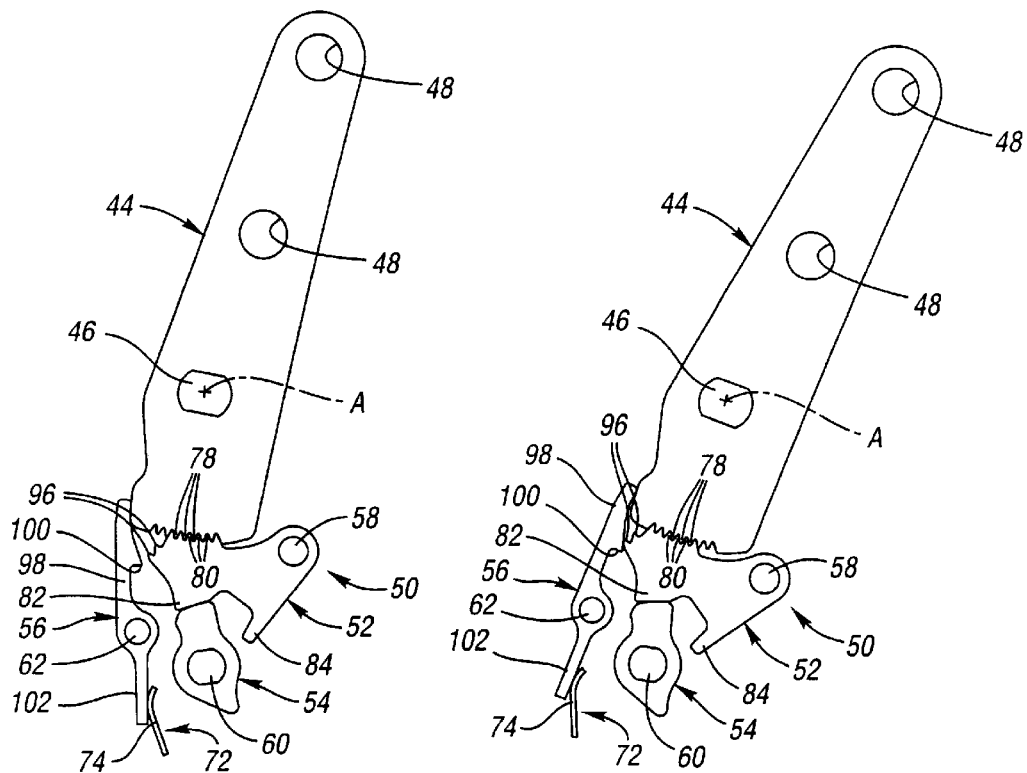
Fig. 8
Fig. 9

SEAT BACK RECLINER FOR VEHICLES

BACKGROUND OF THE INVENTION

1. Field of the Invention

This invention relates to a seat back recliner for positioning a seat back of a vehicle seat in an upwardly extending position and for selectively permitting forward pivoting of the seat back.

2. Background Art

Vehicle seats have previously included recliners that provide positioning of a seat back on a seat cushion in an upwardly extending position while permitting forward pivoting thereof. Such forward pivoting is useful in different applications, such as when the seat back pivots forwardly so that its back side faces upwardly and provides a cargo floor or when the seat is a front seat that pivots forwardly to permit access to a rear seat in a two-door vehicle.

Prior art patents noted during an investigation conducted in connection with the present invention include: U.S. Pat. No. 3,736,026 Ziegler et al.; U.S. Pat. No. 5,154,476 Haider et al.; U.S. Pat. No. 5,690,386 Chabanne; U.S. Pat. No. 5,718,481 Robinson; and U.S. Pat. No. 6,454,355 Biletskiy; and U.S. patent application Publication No. US 2002/0135216 A1 Hamelin et al.

SUMMARY OF THE INVENTION

An object of the present invention is to provide an improved vehicle seat back recliner.

In carrying out the above object, the vehicle seat back recliner of the invention includes a stationary bracket for mounting on a seat cushion of a vehicle seat with which the recliner is to be used. A pivotal bracket of the recliner is mounted for pivotal movement about a pivotal axis on the stationary bracket and is adapted to mount a seat back of the vehicle seat. A lock mechanism of the recliner has a locking pawl mounted on the stationary bracket for movement between locked and unlocked positions with respect to the pivotal bracket. The locking pawl is engaged with the pivotal bracket in the locked position to lock the pivotal bracket against pivotal movement on the stationary bracket with the seat back supported by the pivotal bracket extending in a generally upright position. The locking pawl is disengaged from the pivotal bracket in the unlocked position to permit pivotal movement thereof on the stationary bracket such that the seat back is pivotable with respect to the seat cushion. A control cam of the recliner is mounted on the stationary bracket for movement between blocking and released positions with respect to the locking pawl. The control cam engages the locking pawl in its blocking position to hold the locking pawl in its locked position, and the control cam is movable to the released position to move the locking pawl to its unlocked position. A catch of the recliner is mounted on the stationary bracket for movement between latched and released positions with respect to the locking pawl. The catch engages the locking pawl upon movement thereof to the unlocked position by the control cam to hold the locking pawl against movement to the locked position. The pivotal bracket upon pivoting on the stationary bracket as the seat back pivots rearwardly to its upright position engages and moves the catch to its released position out of engagement with the locking pawl so the locking pawl can move to its locked position in engagement with the pivotal bracket to prevent further pivotal movement so the seat back is then held in its upright position.

The vehicle seat back recliner has the stationary pawl constructed to include a pair of spaced bracket portions between which the pivotal bracket, the locking pawl, the control cam and the catch are mounted. More specifically, the locking pawl, the control cam and the catch are pivotally mounted between the spaced bracket portions of the stationary bracket.

The vehicle seat back recliner also includes a spring that biases the control cam toward its blocking position and further includes a second spring that biases the catch toward its latched position.

The pivotal bracket of the recliner is constructed to include a plurality of teeth and the locking pawl includes a plurality of locking teeth that are engaged with the teeth of the pivotal bracket at different locations in the locked position to angularly position the pivotal bracket. A pivotal connection pivotally supports the locking pawl on the stationary bracket for pivotal movement between its locked and unlocked positions.

The construction of the locking pawl includes a blocking portion and a release arm. A pivotal connection pivotally supports the control cam on the stationary bracket for movement between its blocking and released positions. The first mentioned spring pivotally biases the control cam toward its blocking position into engagement with the blocking portion of the locking pawl. A release connection of the recliner selectively pivots the control cam to its released position against its spring bias into engagement with the release arm of the locking pawl to move the locking pawl from its locked position to its unlocked position.

The locking pawl also includes at least one latching tooth. A pivotal connection pivotally mounts the catch on the stationary bracket for movement between its latched and released positions. The catch includes a latch arm having a latching tooth for engaging the latching tooth of the locking pawl in the latched position of the catch to hold the locking pawl in the unlocked position. The catch also includes a biasing arm that extends from the pivotal connection of the catch in the opposite direction as the latch arm. The second spring engages the biasing arm of the catch to pivotally bias the catch toward its latched position, and the pivotal bracket upon pivoting to the upright seat back position engages the latch arm of the catch to pivot the catch so its latching tooth disengages the latching tooth of the locking pawl to permit the control cam to pivot under the impetus of its spring bias to the blocking position and thereby hold the locking pawl in its locked position.

In its disclosed construction, the locking pawl includes a pair of latching teeth that are engaged by the latching tooth on the latch arm of the catch.

The objects, features and advantages of the present invention are readily apparent from the following detailed description of the preferred embodiment when taken in connection with the accompanying drawings.

BRIEF DESCRIPTION OF THE DRAWINGS

FIG. 1 is a side elevational view of a vehicle with front and rear doors broken away to illustrate the vehicle seating which includes a rear seat having a seat back recliner constructed in accordance with the present invention.

FIG. 2 is a perspective view of the seat back recliner of the invention taken generally from one side of the recliner.

FIG. 3 is a side elevational view of the recliner taken generally from the same side as FIG. 2 but with one bracket portion of a stationary bracket removed to illustrate the manner in which a seat back pivotal bracket is supported and positioned by the recliner components.

FIG. 4 is a perspective view of the recliner similar to FIG. 2 but taken from the opposite side thereof to further illustrate its construction.

FIG. 5 is a schematic view illustrating the recliner components when positioned to hold the rear seat back in its solid line indicated upright sealing position of FIG. 1.

FIG. 6 is a schematic view of the recliner similar to FIG. 5 but showing a released condition where the seat back pivotal bracket thereof is released to pivot forwardly.

FIG. 7 is a view similar to FIG. 6 after the seat back has pivoted forwardly to a horizontal cargo floor position as shown by phantom line representation in FIG. 1.

FIG. 8 is a schematic view similar to FIG. 5 but showing the recliner with its pivotal bracket locked so as to hold the seat back in its most rearwardly inclined position which is shown by phantom line representation in FIG. 1.

FIG. 9 is a schematic view similar to FIG. 8 but showing the recliner locked so its pivotal bracket positions the seat back in the farthest forward upright seating position shown by phantom line representation in FIG. 1.

DETAILED DESCRIPTION OF THE PREFERRED EMBODIMENT

With reference to FIG. 1, a vehicle generally indicated by 10 is illustrated with front and rear side doors partially broken away so as to expose front and rear seats 12 and 14, respectively, mounted on the vehicle floor 16 in any conventional manner. The front seat 12 includes a recliner 18 for angularly positioning a seat back 20 of the front seat on a seat cushion 22 of the front seat. The rear seat 14 includes a hidden line indicated recliner 24 that is constructed in accordance with the present invention to position a seat back 26 of the rear seat on its associated seat cushion 28. As is hereinafter more fully described, the recliner 24 is operable to position the seat back 26 in different angular upright positions and to also permit forward pivoting of the seat back downwardly to a horizontal position where its upwardly facing back side provides a cargo floor that cooperates with the cargo floor to the rear of the rear seat to a cargo compartment.

It should be appreciated that the recliner 24 can also be utilized with the front seat of a two door vehicle to permit forward seat back pivoting that facilities access to the rear seat.

With continuing reference to FIG. 1, any type of conventional release handle 30 is mounted on the rear seat back 26, preferably at its upper end, and is connected to the upper end of a release cable 32. A lower end of release cable 32 is connected to the recliner 24 as is hereinafter more fully described to provide release actuation that unlocks the recliner to permit the pivoting of the seat back.

With reference to FIGS. 2–4, the recliner 24 includes a stationary bracket 34 for mounting on the vehicle seat cushion to an unshown frame thereof by suitable fasteners that extend through connection holes 36. This stationary bracket 34 includes a pair of spaced bracket portions 38 between which most of the components of the recliner are mounted as is hereinafter more fully described. The spaced bracket portions 38 are made from steel with stamped formations 40 including ribs, depressions, etc. that provide strengthening of the stationary bracket. Connections 42, pivotal connections that support components of the recliner as are hereinafter more fully described, and bushings that define the connection holes 36 all cooperate to provide the spaced relationship of the bracket portions 34 from each other so that the recliner components can be mounted therebetween for locking and release of the recliner as is hereinafter more fully described.

With continuing reference to FIGS. 2–4, the recliner 24 also includes a pivotal bracket 44 that is mounted by a pivotal connection 46 on the upper end of the stationary bracket 34 for pivotal movement about a pivotal axis A. This pivotal bracket 44 provides mounting of the associated vehicle seat cushion by unshown connectors that extend through connection holes 48 and attach to an unshown frame of the seat back. This pivotal bracket 44 is located between the spaced bracket portions 38 of the stationary bracket 34 for its pivotal movement which moves the seat back between the different upwardly inclined positions and the forward horizontal cargo position previously described in connection with FIG. 1.

As best illustrated in FIGS. 3, 5 and 6, the recliner 24 includes a lock mechanism 50 having a locking pawl 52 mounted on the stationary bracket 34 between its spaced bracket portions 38 for movement between a locked position shown in FIGS. 3 and 5 and a released position shown in FIG. 6. In the locked position shown in FIGS. 3 and 5, the locking pawl 52 engages the pivotal bracket 44 to lock the pivotal bracket against pivotal movement on the stationary bracket 34 with the seat back supported by the pivotal bracket extending generally upright position as previously described in connection with FIG. 1. In the released position shown in FIG. 6, the locking pawl 52 is disengaged from the pivotal bracket 44 to permit pivoting thereof on the stationary bracket 34 such that the seat back is pivotable with respect to the seat cushion.

As illustrated by continuing reference to FIGS. 3, 5 and 6, the recliner 24 also includes a control cam 54 mounted on the stationary bracket 34 between its spaced bracket portions 38 for movement between a blocking position with respect to the locking pawl 52 as shown in FIGS. 3 and 5 and a released position with respect to the locking pawl as shown in FIG. 6. In the blocking position shown in FIGS. 3 and 5, the control cam 54 engages and holds the locking pawl 52 in its locked position in engagement with the pivotal bracket 44 to prevent seat back pivoting. The control cam 54 is movable to the released position shown in FIG. 6 to move the locking pawl 52 to its unlocked position out of engagement with the pivotal bracket 44 in order to permit seat back pivoting between the different positions as previously described.

As illustrated by further reference to FIGS. 3, 5 and 6, the recliner 24 also includes a catch 56 mounted on the stationary bracket 34 between its spaced bracket portions 38 for movement between a latched position with respect to the locking pawl 52 as shown in FIG. 6 and released position with respect to the locking pawl as shown in FIGS. 3 and 5. Upon movement of the control cam 54 to move the locking pawl 52 to the unlocked position of FIG. 6, the catch 56 engages the locking pawl to hold the locking pawl against movement to its locked position. Upon pivoting of the pivotal bracket 44 on the stationary bracket 34 as the seat back pivots rearwardly to its upright position, the pivotal bracket engages the catch 56 as shown in FIG. 5 and moves the catch to its released position out of engagement with the locking pawl 52 so the locking pawl can move to its locked position in engagement with the pivotal bracket 34 to prevent further pivotal movement so the seat back is then held in its upright position.

As previously mentioned, the stationary bracket 34 includes the pair of spaced bracket portions 38 between which the pivotal bracket 44, the locking pawl 52, the control cam 54 and the catch 56 are mounted for movement as previously described. The pivotal bracket 44 as previously mentioned is mounted for pivotal movement by its pivotal connection 46. Likewise, the locking pawl 52 is mounted for pivotal movement between its locked and unlocked positions by a pivotal connection 58. Similarly, the control cam 54 is mounted by a pivotal connection 60 for pivotal movement between its blocking position shown in FIGS. 3 and 5 and its released position shown in FIG. 6, and the catch 56 is mounted by a pivotal connection 62 for pivotal movement between its latched position shown in FIG. 6 and its unlatched position in FIGS. 3 and 5.

As shown in FIGS. 2 and 3, the recliner 24 includes a first spring 66 that biases the control cam 54 toward its blocking position of FIGS. 3 and 5. This first spring is of the spiral type and is mounted on the outwardly facing side of one of the spaced bracket portions 38 as shown in FIG. 2. More specifically, this spiral spring has an outer end 64 that is hooked to a connector flange 68 of the adjacent bracket portion 38 and has an inner end 70 connected to the pivotal connection 60 of the control cam 54 so as to bias the control cam toward its blocking position illustrated in FIGS. 3 and 5.

The recliner 24 also includes a second spring 72 that is located between the spaced bracket portions 38 of the stationary bracket 34 and biases the catch 56 toward its latched position shown in FIG. 6 in latching engagement with the locking pawl 52 as previously described. More specifically, the spring 72 extends around the bushing that defines one of the connection holes 36 and has a first arm 74 engaged with the catch 56 and a second arm 76 engaged with the bushing that defines the other connection hole 36 so as to provide the clockwise bias of the catch.

As shown in FIG. 3, the pivotal bracket 44 includes a plurality of teeth 78 extending arcuately about the pivotal axis A and the locking pawl 52 includes a plurality of locking teeth 80 extending arcuately and engagable with the pivotal bracket teeth 78 at different locations. More specifically, the locking pawl locking teeth 80 engage the pivotal bracket teeth 78 in the position of FIG. 5 to hold the seat back in its solid line intermediate upright position of FIG. 1. In the locked condition of FIG. 8, the pivotal bracket 44 is positioned by the locking pawl 52 so that the seat back is in its most rearwardly inclined upright position shown in FIG. 1. Similarly, the locked position of FIG. 9 shows the pivotal bracket 44 locked by the locking pawl 52 so the seat back is in its most forward upright position shown by phantom line representation in FIG. 1.

As shown in FIGS. 5 and 6, the locking pawl 52 includes a blocking portion 82 that is engaged by the control cam 54 in its blocking position to hold the locking pawl in its locked position, and the locking pawl 52 also includes a release arm 84 which the control cam 54 engages upon movement against its spring bias to move the locking pawl to its released position. This movement of the control cam is provided by a release connection 86 to the release cable 32 as shown in FIG. 4. More specifically, this release connection 86 is located on the outwardly facing side of the spaced bracket portion 38 on the opposite side of the recliner from the spiral spring 70 shown in FIG. 2 for biasing the control cam pivotal connection 60 as previously described. More specifically, this release connection 86 shown in FIG. 4 includes a lever arm 88 having an inner end fixed to the control cam pivotal connection 60 and having an outer end secured to a control wire 90 of the release cable 32 whose sheath 92 is fixed to a bracket flange 94. Thus, operation of the release cable 32 pivots the lever 88 so the pivotal connection 60 rotates against the bias of the spiral spring 64 shown in FIG. 2 to provide the control cam pivoting in a clockwise direction from the blocking position of FIG. 5 to the released position of FIG. 6.

Locking pawl 52 as shown in FIGS. 5 and 6 includes a pair of latching teeth 96 and the catch 56 has a latch arm 98 including a latching tooth 100 for engaging either of the latching teeth 96 on the locking pawl 92 such as shown in FIG. 6. The catch 56 also includes a biasing arm 102 that extends in the opposite direction from the pivotal connection 62 as the latch arm 98 and is engaged by the arm 74 of spring 72 to provide the clockwise bias of the catch.

When the seat back is in the horizontal cargo position as illustrated by FIG. 7, movement back to the upright position pivots the pivotal bracket 44 clockwise through the position of FIG. 6 to the position illustrated in either FIGS. 5, 8 or 9 whereupon engagement of the pivotal bracket with the latch arm 98 of catch 56 moves the catch counterclockwise against its spring bias by the spring arm 74 to disengage the locking pawl and catch latching teeth 96 and 100. The latching tooth disengagement permits movement of the locking pawl 52 to its locked position with the control cam 54 then moving to its blocking position under its spring bias to provide the recliner locking.

While the preferred embodiment for carrying out the invention has been described in detail, those familiar with the art to which this invention relates will recognize various alternative designs and embodiments for practicing the invention as defined by the following claims.

What is claimed is:

1. A vehicle seat back recliner, comprising:
   a stationary bracket for mounting on a seat cushion of a vehicle seat with which the recliner is to be used;
   a pivotal bracket that is mounted for pivotal movement about a pivotal axis on the stationary bracket and that is adapted to mount a seat back of the vehicle seat;
   a lock mechanism having a locking pawl mounted on the stationary bracket for movement between locked and unlocked positions with respect to the pivotal bracket, the locking pawl engaging the pivotal bracket in the locked position to lock the pivotal bracket against pivotal movement on the stationary bracket with the seat back supported by the pivotal bracket extending in a generally upright position, and the locking pawl being disengaged from the pivotal bracket in the unlocked position to permit pivoting thereof on the stationary bracket such that the seat back is pivotable with respect to the seat cushion;
   a control cam mounted on the stationary bracket for movement between blocking and released positions with respect to the locking pawl, the control cam engaging the locking pawl in its blocking position to hold the locking pawl in its locked position, and the control cam being movable to the released position to move the locking pawl to its unlocked position; and
   a catch mounted on the stationary bracket for movement between latched and released positions with respect to the locking pawl, the catch engaging the locking pawl upon movement thereof to the unlocked position by the control cam to hold the locking pawl against movement to the locked position, and the pivotal bracket upon pivoting on the stationary bracket as the seat back pivots rearwardly to its upright position engaging and moving the catch to its released position out of engagement with the locking pawl so the locking pawl can move to its locked position in engagement with the pivotal bracket to prevent further pivotal movement so the seat back is then held in its upright position.

2. A vehicle seat back recliner as in claim 1 wherein the stationary bracket includes a pair of spaced bracket portions between which the pivotal bracket, the locking pawl, the control cam and the catch are mounted.

3. A vehicle seat back recliner as in claim 2 wherein the locking pawl, the control cam and the catch are pivotally mounted between the spaced bracket portions of the stationary bracket.

4. A vehicle seat back recliner as in claim 1 further including a spring that biases the control cam toward its blocking position.

5. A vehicle seat back recliner as in claim 1 further including a spring that biases the catch toward its latched position.

6. A vehicle seat back recliner as in claim 1 further including a first spring that biases the control cam toward its blocking position, and a second spring that biases the catch toward its latched position.

7. A vehicle seat back recliner as in claim 1 wherein the pivotal bracket includes a plurality of teeth, the locking pawl including a plurality of locking teeth that are engaged with the teeth of the pivotal bracket at different locations in the locked position to angularly position the pivotal bracket, and a pivotal connection that pivotally supports the locking pawl on the stationary bracket for pivotal movement between its locked and unlocked positions.

8. A vehicle seat back recliner as in claim 7 wherein the locking pawl includes a blocking portion and a release arm, a pivotal connection that pivotally supports the control cam on the stationary bracket for movement between its blocking and released positions, a spring that pivotally biases the control cam toward its blocking position into engagement with the blocking portion of the locking pawl, and a release connection for selectively pivoting the control cam to its released position against the bias of the spring into engagement with the release arm of the locking pawl to move the locking pawl from its locked position to its unlocked position.

9. A vehicle seat back recliner as in claim 8 wherein the locking pawl also includes at least one latching tooth, a pivotal connection that pivotally mounts the catch on the stationary bracket for movement between its latched and released positions, the catch including a latch arm having a latching tooth for engaging the latching tooth of the locking pawl in the latched position of the catch to hold the locking pawl in the unlocked position, the catch including a biasing arm that extends from the pivotal connection of the catch in the opposite direction as the latch arm, a second spring that engages the biasing arm of the catch to pivotally bias the catch toward its latched position, and the pivotal bracket upon pivoting to the upright seat back position engaging the latch arm of the catch to pivot the catch so its latching tooth disengages the latching tooth of the locking pawl to permit the control cam to pivot under the impetus of its spring bias to the blocking position and thereby hold the locking pawl in its locked position.

10. A vehicle seat back recliner as in claim 9 wherein the locking pawl includes a pair of latching teeth.

11. A vehicle seat back recliner, comprising:

a stationary bracket for mounting on a seat cushion of a vehicle seat with which the recliner is to be used, and the stationary bracket including a pair of spaced bracket portions;

a pivotal bracket that is adapted to mount a seat back of the vehicle seat, and the pivotal bracket being located between the spaced bracket portions of the stationary bracket and mounted for pivotal movement about a pivotal axis;

a lock mechanism having a locking pawl mounted between the spaced bracket portions of the stationary bracket for movement between locked and unlocked positions with respect to the pivotal bracket, the locking pawl engaging the pivotal bracket in the locked position to lock the pivotal bracket against pivotal movement on the stationary bracket with the seat back supported by the pivotal bracket extending in a generally upright position, and the locking pawl being disengaged from the pivotal bracket in the unlocked position to permit pivoting thereof on the stationary bracket such that the seat back is pivotable with respect to the seat cushion;

a control cam mounted between the spaced bracket portions of the stationary bracket for movement between blocking and released positions with respect to the locking pawl, the control cam engaging the locking pawl in its blocking position to hold the locking pawl in its locked position, and the control cam being movable to the released position to move the locking pawl to its unlocked position; and a catch mounted between the spaced bracket portions of the stationary bracket for movement between latched and released positions with respect to the locking pawl, the catch engaging the locking pawl upon movement thereof to the unlocked position by the control cam to hold the locking pawl against movement to the locked position, and the pivotal bracket upon pivoting on the stationary bracket as the seat back pivots rearwardly to its upright position engaging and moving the catch to its released position out of engagement with the locking pawl so the locking pawl can move to its locked position in engagement with the pivotal bracket to prevent further pivotal movement so the seat back is then held in its upright position.

12. A vehicle seat back recliner, comprising:

a stationary bracket for mounting on a seat cushion of a vehicle seat with which the recliner is to be used, and the stationary bracket including a pair of spaced bracket portions;

a pivotal bracket that is adapted to mount a seat back of the vehicle seat, and the pivotal bracket being located between the spaced bracket portions of the stationary bracket and mounted for pivotal movement about a pivotal axis;

a lock mechanism having a locking pawl mounted between the spaced bracket portions of the stationary bracket for movement between locked and unlocked positions with respect to the pivotal bracket, the locking pawl engaging the pivotal bracket in the locked position to lock the pivotal bracket against pivotal movement on the stationary bracket with the seat back supported by the pivotal bracket extending in a generally upright position, and the locking pawl being disengaged from the pivotal bracket in the unlocked position to permit pivoting thereof on the stationary bracket such that the seat back is pivotable with respect to the seat cushion;

a control cam located between the spaced bracket portions of the stationary bracket, a pivotal connection for mounting the control cam for movement between blocking and released positions with respect to the locking pawl, the control cam engaging the locking pawl in its blocking position to hold the locking pawl in its locked position, and the control cam being movable to the released position to move the locking pawl to its unlocked position;

a first spring mounted on an outwardly facing side of one of the spaced bracket portions of the stationary bracket and biasing the pivotal connection of the control cam to bias the control cam toward its blocking position;

a release connection mounted on an outwardly facing side of the other spaced bracket portion of the stationary bracket and operable to selectively pivot the control cam to its released position against the bias of the first spring into engagement with the locking pawl to move the locking pawl from its locked position to its unlocked position;

a catch mounted between the spaced bracket portions of the stationary bracket for movement between latched and released positions with respect to the locking pawl, the catch engaging the locking pawl upon movement thereof to the unlocked position by the control cam to hold the locking pawl against movement to the locked position, and the pivotal bracket upon pivoting on the stationary bracket as the seat back pivots rearwardly to its upright position engaging and moving the catch to its released position out of engagement with the locking pawl so the locking pawl can move to its locked position in engagement with the pivotal bracket to prevent further pivotal movement so the seat back is then held in its upright position; and a second spring located between the spaced bracket portions of the stationary bracket and biasing the catch toward its latched position.

* * * * *